Sept. 3, 1957   A. J. L. HUTCHINSON   2,804,940
PROCESS FOR DEHYDRATING GAS
Filed Feb. 21, 1956   2 Sheets-Sheet 1

INVENTOR.
ARTHUR J. L. HUTCHINSON
BY Robert M. McManigal
Attorney

United States Patent Office 2,804,940
Patented Sept. 3, 1957

2,804,940
PROCESS FOR DEHYDRATING GAS

Arthur J. L. Hutchinson, Rancho Mirage, Calif.

Application February 21, 1956, Serial No. 566,990

7 Claims. (Cl. 183—115)

This invention relates to improvements in methods of removing water vapor from natural and other gases. More particularly, the invention relates to methods of removing water vapor from high pressure gases by passing the gas to be dehydrated through a zone wherein the gas is contacted in one or more stages with a liquid formed in a second zone wherein the gas is contacted with a solid deliquescent material, in granulated or lump form, such as anhydrous calcium chloride, magnesium chloride or lithium chloride.

Where high pressure gas produced from either gas wells, oil wells or gas distillate wells is piped into high pressure gas gathering systems, it is sometimes necessary to dehydrate the gas at the well head before entering the gas-gathering system as the gas so produced is usually saturated with water vapor at the flowing temperature and pressure. The gases to be dehydrated by this method are usually in excess of 100 p. s. i. g. and generally in excess of 150 p. s. i. g. As an example, in a system producing gas at 500 p. s. i. g. and 70° F. the gas could contain about 41–42 pounds of water vapor per MMSCF. If this gas at this pressure were cooled to 53° F. or below, the water condensed therefrom could cause pipe corrosion, and also result in the formation of gas hydrates which would plug the line. In most cases the gas might reach a temperature of 40° F. or below in winter, in which case the water content of the gas must be reduced to less than 14½ pounds per MMSCF. to avoid these difficulties. For transmission of the gas over long distances it is usually at a pressure of 800 p. s. i. g. or higher. At 800 p. s. i. g. and 40° F. the gas will only hold in the vapor phase 10½ pounds of water per MMSCF. for this reason most of the gas sales contracts require the reduction of the water content of the gas to less than 7 pounds per MMSCF. For some purposes and in some localities, even higher pressures are encountered, for example, up to 2000–5000 p. s. i. g., more or less. One such service is in repressuring oil fields to increase crude oil recovery. Another example is where the field gas is first dehydrated and then subjected to absorption-recovery using a suitable absorption medium, or to low temperature (sub-zero) distillation, to separate the gas into various desired fractions, such as natural gasoline, pentane, butane, propane and ethane from methane and other non-condensable constituents. In some of these operations, which often employ very high pressures and/or very low temperatures, the presence of water vapor in the gas sufficient to cause condensation may be deterimental or even fatal to the operation.

One object of the invention is to provide a method of dehydrating gas to a very low dew point suitable for transmission in high pressure gas transmission lines where hydrates of the gas would cause plugging of the line, and where water condensing in the line would cause corrosion.

Another object of the invention is to provide a method of dehydrating such gases which requires no heat or fuel and presents no fire hazard.

Another object of the invention is to provide a method of dehydrating gas that requires no pumps, blowers, or other equipment that requires power for operation, other than to operate automatic controls.

Another object of my invention is to provide a process of dehydrating gas at the well head, particularly but not exclusively, in remote places, and which requires a minimum of service and maintenance, and no equipment or personnel for recovery or regeneration of chemicals.

Another object of my invention is to provide a process of dehydrating gas which presents no freezing problem in that the water removed from the gas is discharged in the form of a low freezing point brine.

Another object of my invention is to provide a process of dehydrating high pressure gas in which the gas to be dehydrated is contacted with a solid deliquescent material and the liquid so produced is used to partially dehydrate the gas prior to its contact with the solid deliquescent material.

My invention has many other objects, advantages and features, some of which, with the foregoing, will be set forth in the following description in which I will describe certain embodiments of my invention which I have selected for illustrative purposes only in the drawings accompanying and forming a part of the present specification.

Figure 4:
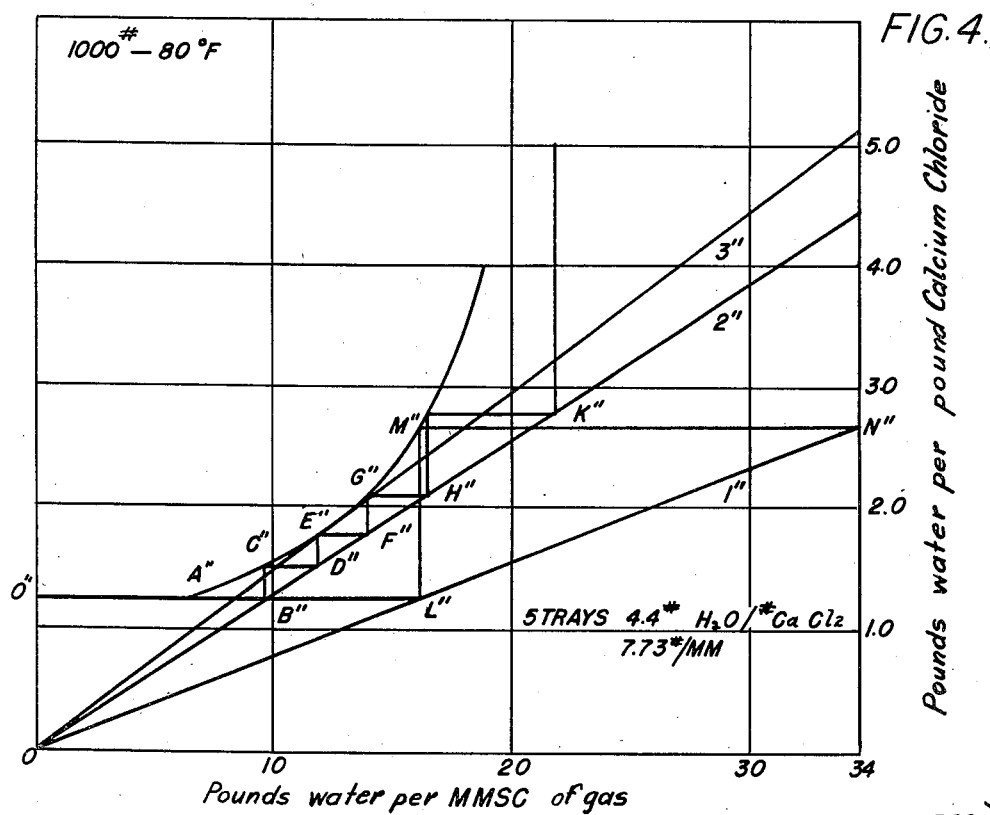
Figure 5:
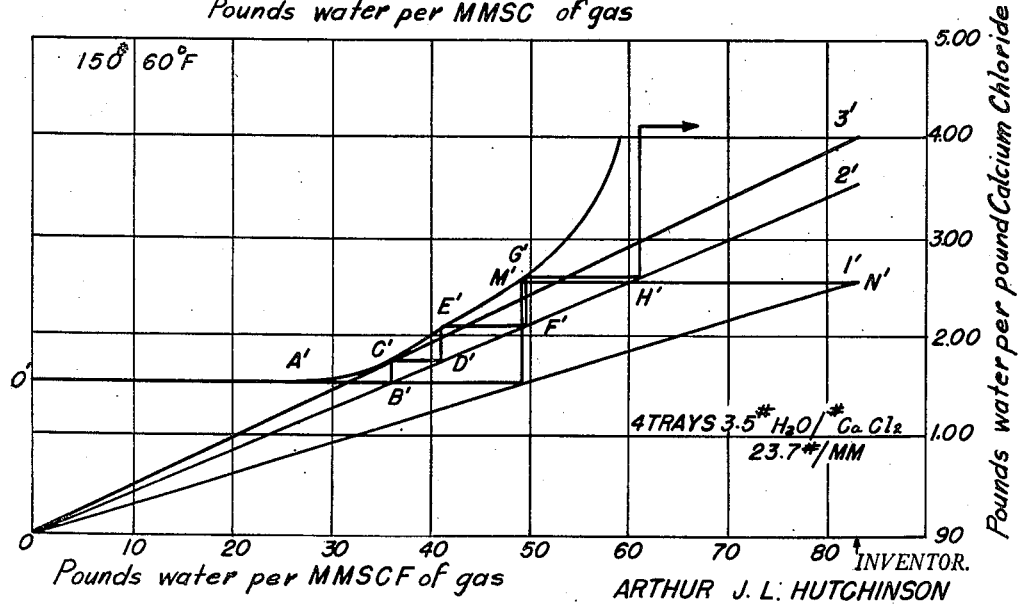

Fig. 4 is a curve showing the equilibrium relationships of water and calcium chloride brine when the gas is delivered at 80° F. and 1000 p. s. i. g. The water content of the gas (pounds per MMSCF.) is plotted against the brine strength expressed in pounds of water per pound of calcium chloride at equilibrium; and Fig. 5 is a curve showing the equilibrium relationships of water and calcium chloride brine when the gas is delivered at 60° F. and 150 p. s. i. g. The water content of the gas (pounds per MMSCF.) is plotted against the brine strength expressed in pounds of water per pound of calcium chloride at equilibrium.

For purposes of illustration, 1 is a well producing gas generally at a pressure above 150 p. s. i. g., liquid water and hydrocarbon liquid, 2 a pipe with control valve 3 connecting the well to gas separator 4 wherein a mechanical separation is made between liquid water, hydrocarbon liquid and gas. Liquid water is withdrawn through line 5 having an automatic control valve 6. Likewise, liquid hydrocarbons are withdrawn through line 7 with automatic control valve 8.

The gas containing water vapor passes through line 9 into dehydrating column 10. The pressure may or may not be reduced at this point. The gas passes through the liquid contact zone 11 into the solid contact zone or bed 12. The solid deliquescent material in lump or granular form is supported on screen 13, which permits the concentrated solution produced by absorption of water vapor by the deliquescent material to drip into the liquid contact zone 11. This deliquescent liquid picks up water from the gas discharged from the line 9 into the dehydrating column 10. The deliquescent liquid becomes diluted as it flows downwardly due to absorption of additional water from the upflowing gas, and the dilute solution is discharged from the column 10 through line 14 by the automatic control valve 15.

Figure 1:
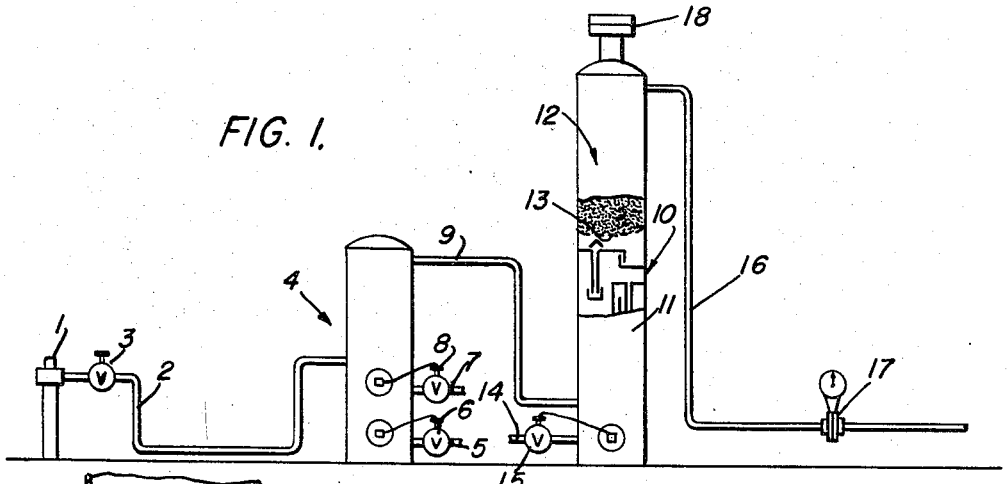
Fig. 1 is a flow diagram of a suitable plant.
Figure 2:
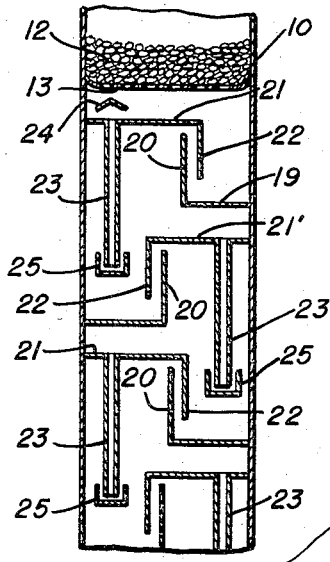
Fig. 2 is a sectional elevation in more or less diagrammatic form, of suitable gas-liquid contacting units, one of these corresponding to the "trays" indicated in zone 11 of Fig. 1.

Because the volume of solution is small compared to the volume of gas being dehydrated, a plurality of efficient contacting units such as that shown in Fig. 2 are used. Others are disclosed in my copending application, Serial No. 567,003, filed concurrently herewith. These units are all of a character designed to permit the brine to absorb water vapor from the gas.

The dehydrated gas leaves the dehydrating column 10 through line 16 and meter 17 to the gas gathering mains. Solid deliquescent material suitably in lump or granular form may be introduced into zone 12 of column 10 through a suitable opening provided with a cover 18.

As stated, the amount of solution produced is small compared with the gas throughout. For example, a gas saturated with water at 500 p. s. i. g. and 70° F. produces about 0.09 gal. per hour of calcium chloride brine from the bed per MMSCF. of gas per day, yielding a dry gas of less than −40° F. dew point. A gas saturated with water at 150 p. s. i. g. and 60° F. produces about 0.217 gal. per hour of calcium chloride brine from the bed per MMSCF. of gas per day, yielding a dry gas of less than −40° F. dew point. A gas saturated with water at 1,000 p. s. i. g. and 80° F. produces about 0.067 gal. per hour of calcium chloride brine from the bed per MMSCF. of gas per day, yielding a dry gas of less than −40° F. dew point.

Referring to Fig. 2, the gas passes upwardly through column 10 countercurrent to the brine flowing down from bed 12 and is removed through line 16 as described. The brine collects in trough 19 of the top unit, until it overflows tray 21 which has a depending member or apron 22. The liquid then flows through downpipe 23 which has a cap or shield 24 to prevent solution dropping directly from the screen 13 to the second tray.

The gas passes upwardly through column 10, and over the top edge of the side 20 of trough 19, and then downwardly through the passage between side 20 and apron 22. It bubbles up through the liquid in the trough 19 and thence into the bed 12, or, in the case of the lower trays, upwardly through the next contacting unit. A sealcap 25 is provided to form a liquid seal at the lower end of pipe 23 to prevent gas from bypassing the trays.

By means of this apparatus, or the apparatus referred to in my copending application, a volume of downflowing liquid far in excess of the net downflow collects on each tray. While the ratio of net downflow of liquid to the volume of gas charged is very low, the ratio of liquid to gas at each contacting unit and in the overall column is quite high. Because of this and because of the efficient contacting, substantial equilibrium can be established in the liquid contacts zone 11. Thus, by the time the brine is discharged from the bottom of a column containing the contacting units, it is sufficiently dilute so that it may be discarded. It could be regenerated by evaporating off the water, but because of the low cost of calcium chloride used in dehydrating the gas by this method and because of the low calcium chloride consumption brought about by this invention, recovery of the salt is not worthwhile in most instances.

In my process, it is necessary that the gas pass vertically upward through the solid zone 12. Calcium chloride has four solid phases, $CaCl_2$, $CaCl_2,H_2O$, $CaCl_2,2H_2O$ and $CaCl_2,6H_2O$, which, as it picks up more water, dissolves to form the brine. The vapor pressure with respect to water of the various forms of the salt, at any temperature increases as the number of molecules of water of crystallization increases. In a vertical column with the gas passing upwardly, the hexahydrate forms in the lower portion and the material lying above it will contain the duo-hydrate, then the mono-hydrate and finally the anhydrous $CaCl_2$ near the top. Thus it is seen that the gas progressively contacts salt of increasing affinity for water so that the outgoing gas from the column 10 is dehydrated to the equilibrium point of the anhydrous salt, which corresponds to a dew point of the gas below about −40° F.

In one installation, the well produced gas, liquid hydrocarbons and liquid water at a well head pressure of 650 p. s. i. g. The pressure was reduced by valve 3 to 500 p. s. i. g. at a temperature of 70° F. and the gas, liquid water and liquid hydrocarbon entered separator 4 through line 2. The liquid water and liquid hydrocarbons were withdrawn from the separator 4 through lines 5 and 7, respectively. The gas, saturated with water vapor at 70° F., in the amount of 3 MMSCF. per day was passed into the dehydrating column 10 through line 9.

The solid contact zone 12 was filled with about 725 pounds of anhydrous calcium chloride in lump form. The liquid contact zone consisted of five efficient contact units of the type referred to above, in a 16 inch I. D. column about 8 feet high. It was found that the brine dripping from the solid bed 12 through screen 13 was substantially a saturated solution containing about 1.4 pounds of water per pound of calcium chloride.

The amount of downflow from the bed 12 to the top tray was about 0.09 gallon per hour per MMSCF. of gas feed per day. The brine discharged, about 0.22 gallon per hour MMSCF. per day, from line 14 contained 4 pounds of water per pound of calcium chloride, corresponding to a utilization of 10.5 pounds of anhydrous calcium chloride per MMSCF. of gas treated or about 31.5 pounds of $CaCl_2$ per day on the unit described, showing how infrequently it is necessary to replenish the tower, and how efficiently it utilizes the salt. The dew point of the gas leaving through line 16 was less than −40° F., corresponding to a water content of less than one-half pound per MMSCF. of gas.

It will be readily be seen that I have provided an efficient and economical method of dehydrating gas so that the dehydrating gas has a low dew point usually −40° F. or lower. This dew point is sufficiently low that there will be no trouble from corrosion or from freezing of water vapor or formation of solid hydrocarbon hydrates in the transmission lines even at the low temperatures frequently encountered.

It will also be seen that a unit charge of approximately 725 pounds of anhydrous calcium chloride will operate for approximately twenty-three days when treating 3,000,000 s. c. f. of saturated gas per day at 500 p. s. i. g. and 70° F., and that the process requires practically no maintenance except for occasional inspection and to replenish the calcium chloride at infrequent intervals. Moreover, no pumps or regenerating equipment is required, the power being supplied solely by the energy of the gas. This is important at any installation because of decreased investment, operating and maintenance costs, but is particularly important in oil and gas field installations, more particularly in remote areas.

Figure 3:
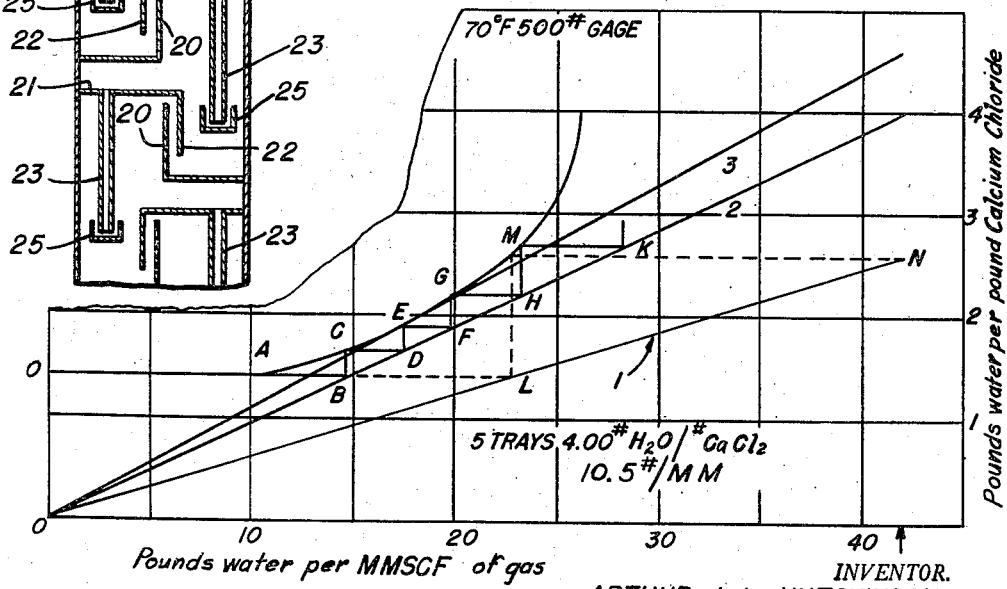
Fig. 3 is a curve showing the equilibrium relationships of water and calcium chloride brine when the gas is delivered at 70° F. and 500 p. s. i. g. The water content of the gas (pounds per MMSCF.) is plotted against the brine strength expressed in pounds of water per pound of calcium chloride at equilibrium.

Figs. 3, 4, and 5 each represents a graphical solution of the dehydration of gas passing through a column containing trays or units of the character referred to, to contact the gas with brine. By so contacting the gas with the brine on each tray, the gas is partially dehydrated before it enters the bed of lump or granular anhydrous calcium chloride or other deliquescent solid in zone 12. The water remaining in the gas entering zone 12 forms the brine which passes downward through the contact units.

In Fig. 3, the curve (representing the conditions that exist at a pressure of 500 p. s. i. g. and 70° F.) shows a graph of equilibrium that exists between the water-vapor content of the gas, expressed in pounds of water per MMSCF. of gas, and the water content of calcium chloride brine, expressed in pounds of water per pound of calcium chloride. Under these conditions, the saturated gas contains about 41–42 pounds of water vapor per MMSCF. of gas. As an example, the point C on the curve shows that a gas containing about 14.5 pounds of water vapor per MMSCF. is in equilibrium with calcium chloride brine containing about 1.66 pounds of water per pound of calcium chloride. Likewise, point M shows that a gas containing about 22.5 pounds of water vapor per MMSCF. is in equilibrium with calcium chloride brine containing about 2.5 pounds of water per pound of calcium chloride. Point A represents the concentration of brine that drips off the solid calcium chloride due to absorption and solution of water vapor, namely, about 1.4 pounds of water per pound of calcium chloride. This point is defined as the minimum water content of a calcium chloride brine that can exist as a liquid at a temperature of 70° F. This point also shows that the brine is in equilibrium with a gas containing about 10.5 pounds of water vapor per MMSCF. Therefore, a gas entering the solid calcium chloride bed containing about 10.5 pounds or less of water per MMSCF. at 500 p. s. i. g. and 70° F. would not form a brine, but at the most would form the calcium chloride hexa-hydrate.

In Fig. 3, lines 1, 2, and 3 are operating lines and give the limit of equilibrium that will exist on a tray with any given downflow rate. As this plot is made on the basis of pounds of water per MMSCF. versus pounds of water per pound of calcium chloride, and the volume of calcium chloride brine is a direct function of the water content of the gas entering the solid calcium chloride bed, and since the weight of the active constituent of the brine, calcium chloride, remains constant in flowing down through the column, these are straight lines connecting the water content of saturated gas at the operating temperature and pressure, to the zero water content of calcium chloride, and the zero water content of gas.

In a column containing five or more theoretical trays, the calcium chloride bed 12 would extract the amount of water represented by the length of the line O—B, i. e., about 14.5 pounds of water per MMSCF. of gas forming a brine containing about 1.4 pounds of water per pound of calcium chloride. The brine on the top tray would change in composition corresponding to that shown by point C, i. e., from a water content of about 1.4 pounds per pound of calcium chloride, to a water content of about 1.66 pounds per pound of calcium chloride. The amount of water extracted in the top tray or unit is represented by the length of the line C—D, namely, about 2.9 pounds per MMSCF. of gas. On the next lower unit the brine would change in composition to that shown by point E, namely, to about 1.9 pounds of water per pound of calcium chloride in the solution. The amount of water extracted in the second tray is represented by the length of the line E—F, namely, about 2.4 pounds per MMSCF. of gas. In like manner, the change of water content of the gas and change of brine composition at each additional theoretical tray may be determined from the curve. The solution leaving the final tray contains about 4 pounds of water per pound of calcium chloride, and for all practical purposes is exhausted.

On the other hand, if only one tray were used, the conditions at equilibrium would be as shown on line 1, that is: The brine entering the tray from the bed 12 would be of the same composition as that stated above, namely, about 1.4 pounds of water per pound of calcium chloride. The amount of water extracted in the bed 12 would be represented by the length of the line O—L (about 22.5 pounds per MMSCF. of gas) showing that the gas leaving the single tray would contain about 22.5 pounds of water vapor per MMSCF. of gas. On the tray the brine composition would change to that shown at point M, namely, about 2.5 pounds of water per pound of calcium chloride, absorbing about 19.5 pounds of water per MMSCF. of gas represented by the length of the line M—N. Line 2 shows the requirements of four and a fraction theoretical trays that produce a brine containing about 4 pounds of calcium chloride. Line 3, which is tangential to the equilibrium curve, shows the maximum possible dilution of calcium chloride which could be obtained with an infinite number of contact trays.

In Fig. 4, the curve (representing the conditions that exist at a pressure of 1000 p. s. i. g. and 80° F.) shows a graph of equilibrium that exists between the water-vapor content of the gas, expressed in pounds of water per MMSCF. of gas and the water content of calcium chloride brine, expressed in pounds of water per pound of calcium chloride. Under these conditions, the saturated gas contains about 34 pounds of water vapor per MMSCF. of gas. As an example, the point C″ on the curve shows that a gas containing about 9.6 pounds of water vapor per MMSCF. is in equilibrium with calcium chloride brine containing about 1.5 pounds of water per pound of calcium chloride. Likewise, point M″ shows that a gas containing about 15.8 pounds of water vapor per MMSCF. of gas is in equilibrium with calcium chloride brine containing about 2.7 pounds of water per pound of calcium chloride. Point A″ represents the concentration of brine that drips off the solid calcium chloride due to absorption and solution of water vapor, namely, about 1.25 pounds of water per pound of calcium chloride. This point is defined as the minimum water content of a calcium chloride brine that can exist as a liquid at a temperature of 80° F. This point also shows that the brine is in equilibrium with a gas containing about 6.5 pounds of water per MMSCF. Therefore, a gas entering the solid calcium chloride bed 12 containing about 6.5 pounds or less of water per MMSCF. at 1000 p. s. i. g. and 80° F. would not form a brine, but at the most would form the calcium chloride hexahydrate.

Lines 1″, 2″, and 3″ are operating lines and give the limit of equilibrium that will exist on a tray with any given downflow rate. Line 2″ shows the requirements of four and a fraction theoretical trays that produce a brine containing about 4.4 pounds of water per pound of calcium chloride. Line 3″, which is tangential to the equilibrium curve, shows the maximum possible dilution of calcium chloride which could be obtained with an infinite number of contact trays.

In a column containing five or more theoretical trays, the calcium chloride bed 12 would extract the amount of water represented by the length of the line O″—B″, i. e., about 9.6 pounds of water per MMSCF. of gas forming a brine containing about 1.25 pounds of water per pound of calcium chloride. The brine on the top tray would change in composition corresponding to that shown by point C″, i. e., from a water content of about 1.25 pounds per pound of calcium chloride, to a water content of about 1.5 pounds per pound of calcium chloride. The amount of water extracted in the top tray is represented by the length of the line C″—D″, namely, about 2.5 pounds per MMSCF. of gas. On the lower unit the brine would change in composition to that shown by the point E″, namely, to about 1.75 pounds of water per pound of calcium chloride. The amount of water extracted in the second tray is represented by the length of the line E″—F″, namely, about 2.0 pounds of water per MMSCF. of gas. In like manner the change of water content of the gas and change of brine composition at each additional theoretical tray may be determined from the curve. The solution leaving the final tray contains about 4.4 pounds of water per pound of calcium chloride, and for all practical purposes is exhausted.

On the other hand, if only one tray were used, the conditions at equilibrium would be as shown on line 1, that is: The brine entering the tray from the bed 12 would be of the same composition as that stated above, namely, about 1.25 pounds of water per pound of calcium chloride. The amount of water extracted in the bed 12 would be represented by the length of the line O″—L″ (15.75 pounds per MMSCF. of gas) showing that the gas leaving the single tray would contain about 15.75 pounds of water vapor per MMSCF. of gas. On the tray the brine composition would change to that shown at point M", namely, about 2.7 pounds of water per pound of calcium chloride, absorbing about 18.25 pounds of water per MMSCF. of gas represented by the length of the line M"—N".

In Fig. 5, the curve (representing the conditions that exist at a pressure of 150 p. s. i. g. and 60° F.) shows a graph of equilibrium that exists between the water-vapor content of the gas, expressed in pounds of water per MMSCF. of gas, and the water content of calcium chloride brine, expressed in pounds of water per pound of calcium chloride. Under these conditions, the saturated gas contains about 83 pounds of water vapor per MMSCF. of gas. As an example, the point C' on the curve shows that a gas containing about 35 pounds of water vapor per MMSCF. of gas is in equilibrium with calcium chloride brine containing about 1.78 pounds of water per pound of calcium chloride. Likewise, point G' shows that a gas containing about 49 pounds of water vapor per MMSCF. of gas is in equilibrium with calcium chloride brine containing about 2.6 pounds of water per pound of calcium chloride. Point A' represents the concentration of brine that drips off the solid calcium chloride due to absorption and solution of water vapor, namely, about 1.55 pounds of water per pound of calcium chloride. This point is defined as the minimum water content of a calcium chloride brine that can exist as a liquid at a temperature of 60° F. This point also shows that the brine is in equilibrium with a gas containing about 27 pounds of water vapor per MMSCF. of gas. Therefore, a gas entering the solid calcium chloride bed 12 containing about 27 pounds or less of water per MMSCF. at 150 p. s. i. g. and 60° F. would not form a brine, but at the most would form the calcium chloride hexa-hydrate.

Lines 1', 2', and 3' are operating lines and give the limit of equilibrium that will exist on a tray with any given downflow rate. Line 2' shows the requirements of three and a fraction theoretical trays that produce a brine containing about 3.5 pounds of water per pound of calcium chloride. Line 3', which is tangential to the equilibrium curve, shows the maximum possible dilution of calcium chloride which could be obtained with an infinite number of contact trays.

In a column containing four or more theoretical trays, the calcium chloride bed 12 would extract the amount of water represented by the length of the line O'—B', i. e., about 36 pounds of water per MMSCF. of gas forming a brine containing about 1.55 pounds of water per pound of calcium chloride. The brine on the top unit would change in composition corresponding to that shown by point C', i. e., from a water content of about 1.55 pounds per pound of calcium chloride to a water content of about 1.78 pounds per pound of calcium chloride. The amount of water extracted in the top tray is represented by the length of the line C'—D', namely, about 5.5 pounds per MMSCF. of gas. On the next lower unit the brine would change in composition to that shown by point E', namely, to about 2.1 pounds of water per pound of calcium chloride. The amount of water extracted on the second tray corresponds to the length of the line E'—F', namely, about 7.5 pounds of water per MMSCF. of gas. In like manner, the change of water content of the gas and change of brine composition at each additional theoretical tray may be determined from the curve. The solution leaving the final tray contains about 3.5 pounds of water per pound of calcium chloride, and for all practical purposes is exhausted.

On the other hand, if only one tray were used, the conditions at equilibrium would be as shown on line 1, that is: The brine entering the tray from the bed 12 would be of the same composition as that stated above, namely, about 1.55 pounds of water per pound of calcium chloride. The amount of water extracted in the bed 12 would be represented by the length of the line O'—L', that is, about 48.8 pounds per MMSCF. of gas, showing that the gas leaving the single tray would contain about 48.8 pounds of water vapor per MMSCF. of gas. On the tray the brine composition would change to that shown at point M', namely, about 2.56 pounds of water per pound of calcium chloride, absorbing about 34.2 pounds of water per MMSCF. of gas represented by by the length of the line M'—N'.

It has previously been suggested to dehumidify low pressure gases such as, for example, air for use in air conditioning purposes by passing the stream of gas horizontally through a bed of deliquescent solid such as calcium chloride. The horizontal bed of calcium chloride is supported on a screen or perforated plate to permit the brine formed in the operation to drain out of the bed. Hoppers are provided to replenish the bed as it is consumed. In the horizontal type of operation the brine which is formed drains downwardly through the bed so that that portion of the bed nearest the supporting screen is composed of a mixture of the hexahydrate and occluded brine. Thus, a substantial portion of the horizontally flowing gas is in equilibrium with the hexahydrate and possibly a part of it is in equilibrium with the duo- and mono-hydrates at other points. Only that portion of the gas which passes through the upper layer of the horizontal bed can come in contact with the anhydrous calcium chloride. Since the dehumidifying effect of the hexahydrate and of the brine occluded to it is substantially less than that of the lower hydrates which are in turn less hygroscopic than the unhydrated salt, the dew point of the resultant total gas emerging from the horizontal bed is higher than that of a gas treated in a vertical column such as is employed in the present invention. The dew point would be substantially higher than would be desired in a high pressure hydrocarbon gas to be transmitted through pipe lines.

It has been proposed to recycle the brine produced in such horizontal bed operations over trays over which the gas is passed. This not only requires the use of pumps, which is a disadvantage particularly in oil or gas field work where power is at a premium, but the effect produced is at best that of a single tray operation which fails to take full advantage of the dehydrating properties of the brine even if the efficiency of the tray were such as to establish substantial equilibrium, as may be seen from Fig. 3. Moreover, while this operation might be feasible either with or without regeneration of the brine for air conditioning purposes, or for dehumidifying low pressure fuel gas, such as coke oven or other manufactured gas, it would result in an inordinate and uneconomical consumption of calcium chloride if it were applied to field gases, and at the same time would not effect the necessary degree of dehydration.

It has also been proposed to dehydrate coke oven gas and similar low pressure fuel gases by first contacting them with a strong calcium chloride brine pumped over contacting elements, and thereafter contacting it with solid calcium chloride deposited on coke or other support. Here again the brine is contacted with the gas in a single stage operation which would leave a gas of high moisture content as may be seen from Fig. 3. To further reduce the moisture content to that which would be satisfactory in low pressure gas mains, the partially dehydrated gas is passed over coke upon which solid calcium chloride has been deposited. In this case passage of the gas is continued until the calcium chloride on the coke is converted to the hexa-hydrate, it being necessary to stop at this point to prevent the calcium chloride from being dissolved off the coke. This at best reduces the dew point to about +30° F. Hot gases are periodically passed through the tower in which the coke and calcium chloride is contained to reconvert the hexahydrate to the monohydrate or unhydrated form. A portion of the brine is continuously withdrawn and reconcentrated by hot flue gas. The process requires evaporation of 82.8 pounds of water per MMSCF. of gas processed at 80° F. and 10 p. s. i. g. Regeneration is essential in the process. In gas and oil fields, this is uneconomical both because heat is expensive and because such a process would require the frequent attention of an operator.

It can be seen that neither of these processes would be suitable for service with high pressure hydrocarbon gases where the dew point must be reduced to an extremely low figure.

Passing the gas vertically through a single bed of deliquescent material as contemplated by this invention, after bringing it into substantial equilibrium with the brine at each stage of a multistage contacting apparatus, gives the lowest dew point to the gas with the maximum utilization of the deliquescent material so that consumption thereof is so low that the resulting brine can be discarded. A further advantage is that it prevents the deposition of solid crystals on the support screen 13. In the horizontal type operation plugging of the bottom screen due to crystal formation is a problem. Moreover in my operation, the dew point of the gas is reduced to the minimum as the gas leaves the top of the solid contact zone 12. This is not true in the case of a horizontally disposed bed.

As has been noted, in systems employing brine, or wherein the calcium chloride is converted only to the hexahydrate, the dew point of the gas is too high for use under conditions where low temperatures and high pressures are encountered.

From the foregoing description, the uses and advantages of my invention will be readily understood by those skilled in the art to which the invention appertains. While I have described my invention in detail and with respect to the preferred forms thereof, I desire to have it understood that the forms described are merely illustrative and that the invention is not to be limited to the details disclosed herein, but is to be accorded the full scope of the appended claims.

I claim:

1. A process for dehydrating a moisture containing hydrocarbon gas which comprises passing the gas at a pressure in excess of 100 p. s. i. g. into a predrying zone, said zone comprising a plurality of serially arranged vapor-liquid contacting zones, passing a hygroscopic liquid successively through said contacting zones, passing all of said wet gas through each of said contacting zones countercurrent to the flow of said liquid, removing spent liquid from the first of said contacting zones, passing the partially dehydrated gas from the last of said zones upwardly through a compact bed deliquescent solid particles wherein all of said gas contacts said deliquescent particles, the dehydrating power of said particles increasing in the direction of flow of said gas so that the last particles contacted by said gas are substantially anhydrous, removing the dehydrated gas from the system, passing hygroscopic liquid formed in the bottom portion of said bed to the last of said contacting zones through which said gas passes, as the hygroscopic liquid employed in said predrying zone, the concentration of dehydrating agent in said liquid decreasing progressively from the last contacting zone to the first contacting zone through which said gas is passed.

2. The process of claim 1 wherein the deliquescent solid is calcium chloride.

3. The process of claim 1 wherein the gas is a natural field gas.

4. A process for substantially completely dehydrating gas which comprises continuously passing all of said gas at a pressure in excess of 100 p. s. i. g. through a plurality of serially arranged liquid-gas contacting zones, passing a solution of a dehydrating agent through said zones countercurrent to said gas, the concentration of the solution progressively increasing in each zone in the direction of flow of said gas, removing spent solution from the first of said zones through which the gas is passed, passing the partially dehydrated gas from the last contacting zone upwardly through a compact bed of solid particulate dehydrating agent wherein all of said gas contacts said dehydrating agent thereby converting said dehydrating agent from an initially substantially anhydrous form to a hydrated form and converting part of said agent to a substantially saturated solution, said bed being progressively less hydrated from the bottom to the top thereof, passing the saturated solution of dehydrating agent to the last of said contacting zones through which the gas is passed, the concentration of the liquid in said last zone approaching equilibrium with the gas passing therethrough at the operating temperature and pressure, and removing the dehydrated gas from the system.

5. A process for substantially completely dehydrating gas which comprises continuously passing all of said gas at a pressure in excess of 100 p. s. i. g. through a plurality of serially arranged liquid-gas contacting zones, passing a solution of a dehydrating agent through said zones countercurrent to said gas, the concentration of the solution progressively increasing in each zone in the direction of flow of said gas, removing spent solution from the first of said zones through which the gas is passed, passing the partially dehydrated gas from the last contacting zone upwardly through a compact bed of solid particulate dehydrating agent wherein all of said gas contacts said solid dehydrating agent thereby converting said dehydrating agent from an initially substantially anhydrous form to a hydrated form and converting part of said agent to a substantially saturated solution, said bed being progressively less hydrated from the bottom to the top thereof, passing the saturated solution of dehydrating agent to the last of said contacting zones through which the gas is passed, and removing the dehydrated gas from the system, the volume of liquid maintained in each of said contacting zones being in substantial excess of the net flow of liquid to each of said zones, thereby maintaining a high ratio of liquid to gas in each contacting zone.

6. The process of claim 5 wherein substantial equilibrium is established in each of the contacting zones.

7. The process of claim 5 wherein the dehydrated gas is in substantial equilibrium with the anhydrous form of the dehydrating agent and has a dew point below about −40° F.

References Cited in the file of this patent
UNITED STATES PATENTS

| | | |
|---|---|---|
| 1,855,615 | Sperr | Apr. 26, 1932 |
| 2,027,094 | Downs | Jan. 7, 1936 |
| 2,091,353 | Downs | Aug. 31, 1937 |
| 2,174,186 | Downs et al. | Sept. 26, 1939 |
| 2,279,326 | Kaufman | Apr. 14, 1942 |
| 2,738,853 | Green | Mar. 20, 1956 |